(12) United States Patent
Geng et al.

(10) Patent No.: US 7,843,688 B2
(45) Date of Patent: Nov. 30, 2010

(54) LATCHING MECHANISMS FOR PORTABLE ELECTRONIC DEVICES

(75) Inventors: Yu Ming Geng, Beijing (CN); Chunlai Zhang, Beijing (CN); Qiang Liu, Beijing (CN); Juntao Shao, Xiangfan (CN)

(73) Assignee: Nokia Corporation, Espoo (FI)

( * ) Notice: Subject to any disclaimer, the term of this patent is extended or adjusted under 35 U.S.C. 154(b) by 205 days.

(21) Appl. No.: 12/146,366

(22) Filed: Jun. 25, 2008

(65) Prior Publication Data

US 2009/0323279 A1   Dec. 31, 2009

(51) Int. Cl.
*G06F 1/16* (2006.01)
(52) U.S. Cl. .................. 361/679.58; 455/347; 313/495; 345/690
(58) Field of Classification Search .................. 455/347, 455/575.8; 439/131; 429/97; 403/329; 379/433.11; 349/131, 58, 60, 64; 313/512, 113, 582, 313/495, 46; 361/679.01, 679.27, 679.21, 361/679.24, 679.02, 679.05, 679.06, 679.22; 345/82, 84, 690, 156, 173; 248/398
See application file for complete search history.

(56) References Cited

U.S. PATENT DOCUMENTS

| | | | |
|---|---|---|---|
| 5,308,716 A | 5/1994 | Shababy et al. | |
| 6,382,867 B2 | 5/2002 | Serre | |
| 6,563,927 B2 | 5/2003 | Mote et al. | |
| 6,842,633 B1 | 1/2005 | Deo et al. | |
| 7,301,596 B1 * | 11/2007 | Morganstern et al. | 349/131 |
| 2006/0148442 A1 * | 7/2006 | Liu et al. | 455/347 |
| 2008/0160803 A1 * | 7/2008 | Morganstern et al. | 439/131 |

FOREIGN PATENT DOCUMENTS

| | | |
|---|---|---|
| DE | 101 35 934 | 3/2003 |
| DE | 10 2006 033 580 | 2/2008 |

OTHER PUBLICATIONS

International Search Report for PCT Application No. PCT/FI2009/050516 dated Oct. 7, 2009.

* cited by examiner

*Primary Examiner*—Hung V Duong
(74) *Attorney, Agent, or Firm*—Harrington & Smith

(57) ABSTRACT

A latching mechanism (10, 20) for a portable electronic device, the latching mechanism comprising one or more of a male/female element (10/20) configured to provide for latching under physical engagement with one or more of a complementary female/male element (20/10), one or more of the male/female elements (10/20) configured to be moved from an unlatched configuration to a latched configuration by inter-engagement, the latched configuration configured to provide for physical inter-engagement of the male and female elements (10, 20) which is configured to provide a bias to the one or more of the male/female elements (10/20) that resists physical disengagement of the male and female elements (10, 20).

21 Claims, 15 Drawing Sheets

Pillar on Battery cover

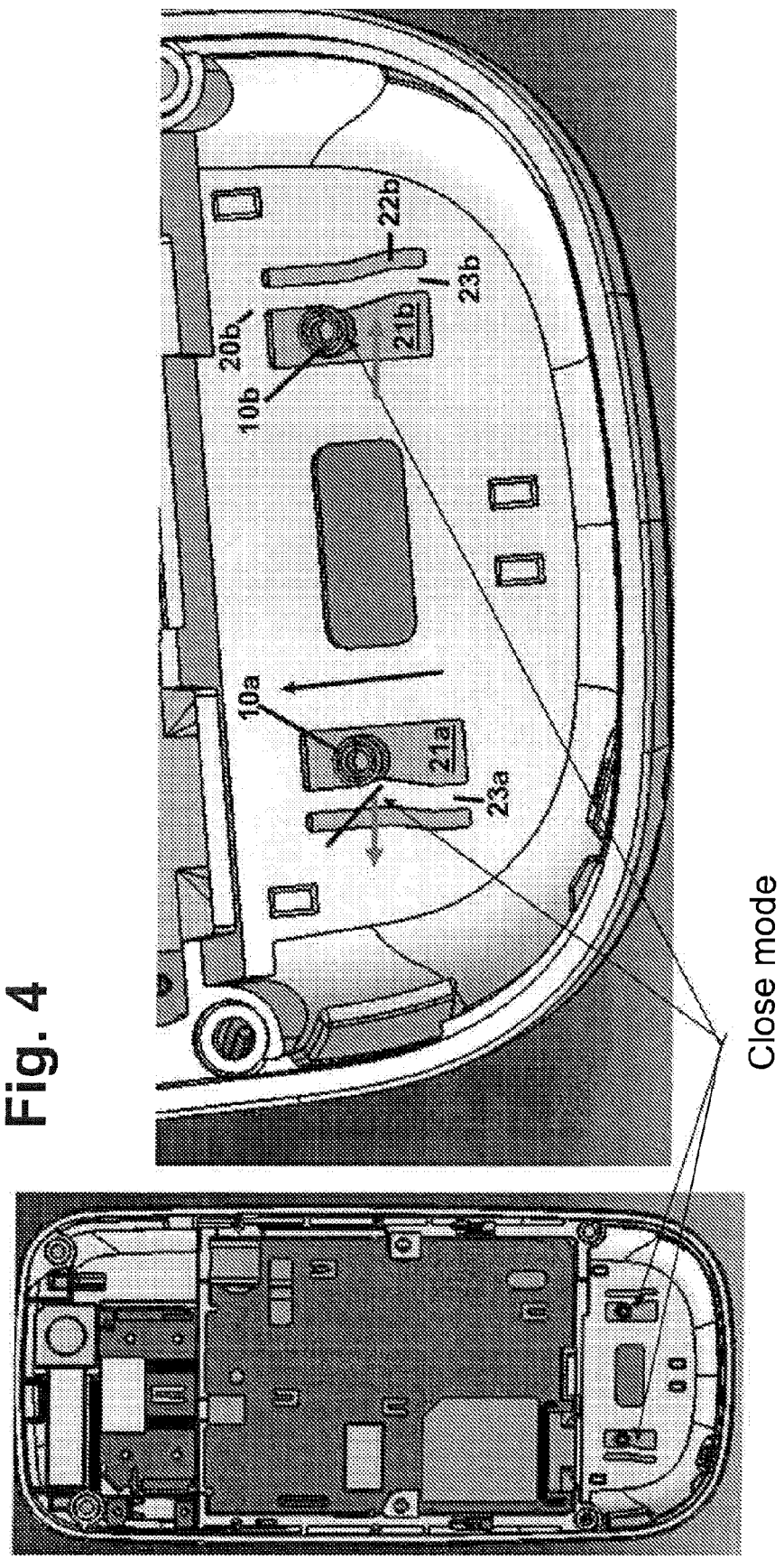

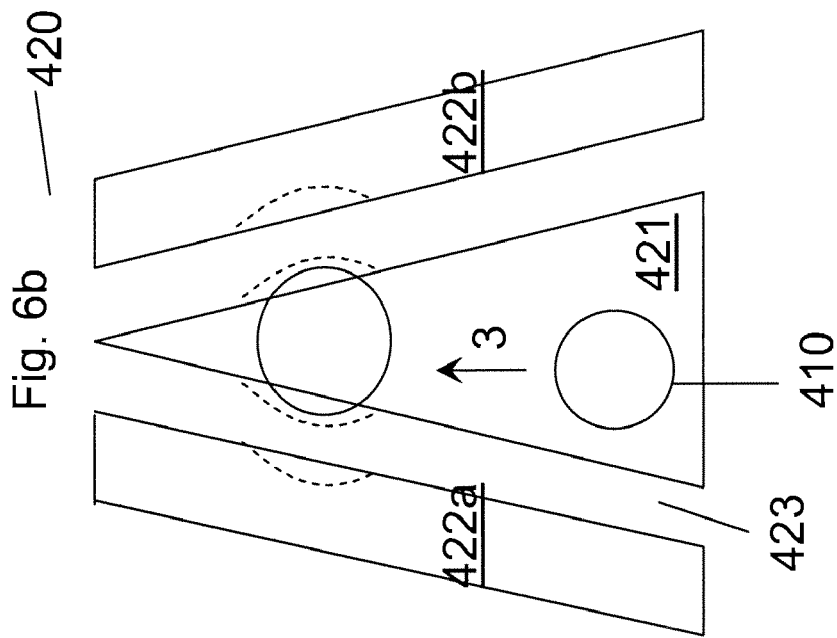
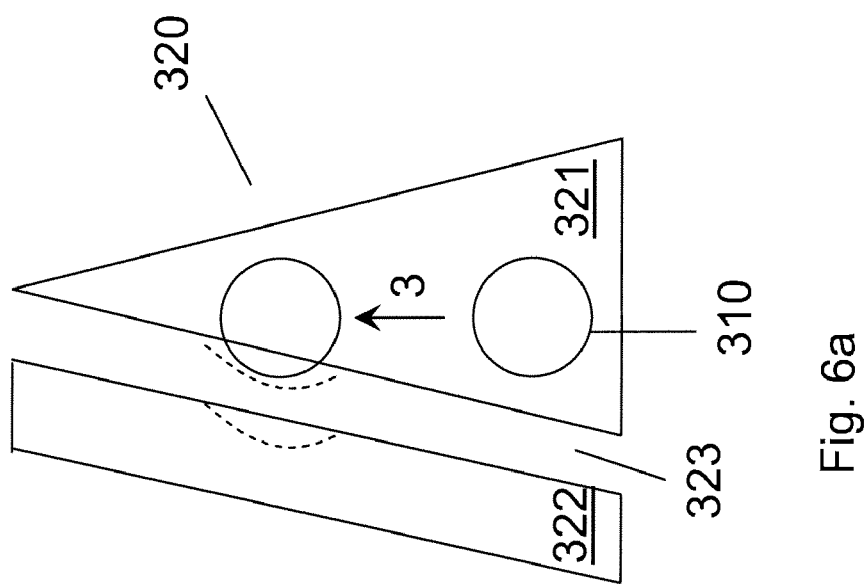

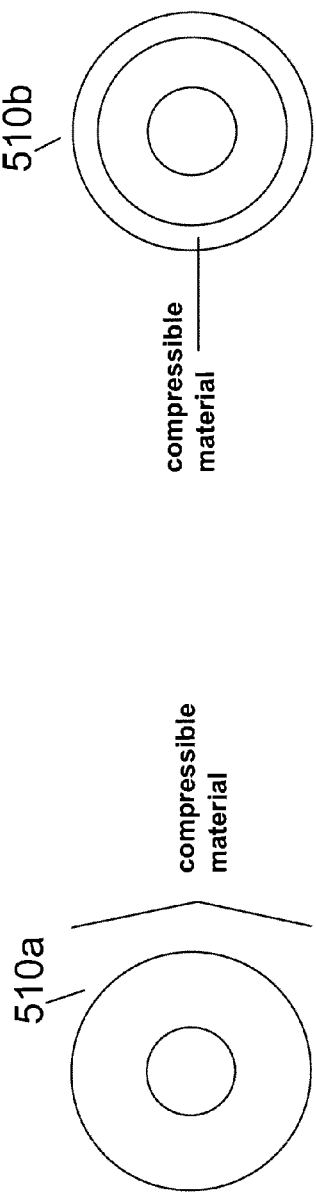
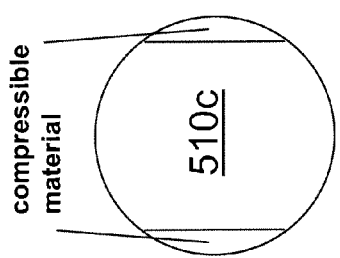
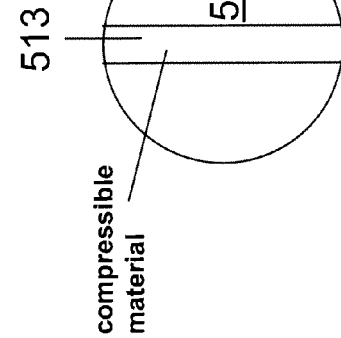
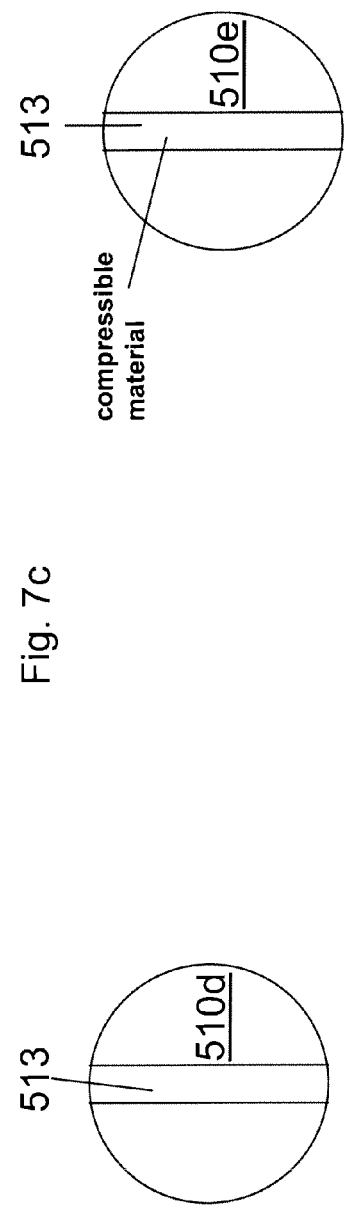

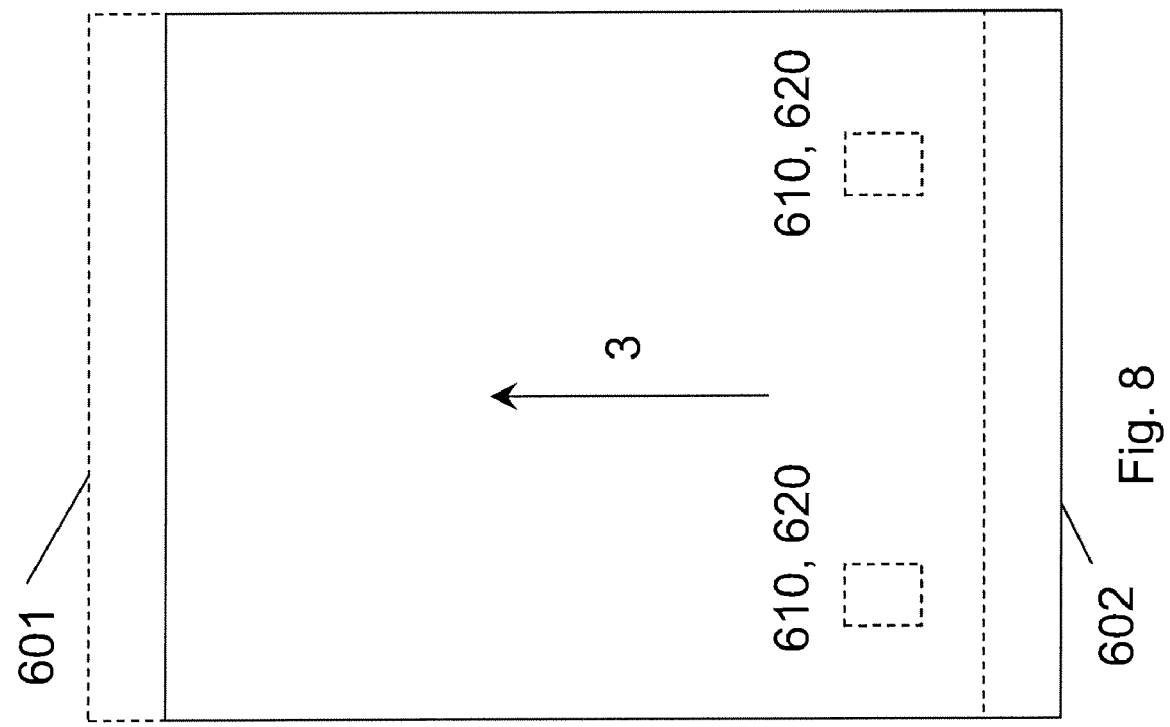

LATCHING MECHANISMS FOR PORTABLE ELECTRONIC DEVICES

TECHNICAL FIELD

The present invention relates to the field of latching mechanisms, associated methods, and apparatus/devices. The latching mechanisms are for portable electronic devices, in particular, so-called hand-portable electronic devices which may be hand-held in use (although they may be placed in a cradle in use). Such hand-portable electronic devices include so-called Personal Digital Assistants (PDAs).

The portable electronic devices may provide one or more audio/text/video communication functions (e.g. telecommunication, videocommunication, and/or text transmission (Short Message Service (SMS)/Multimedia Message Service (MMS)/emailing) functions), interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture function (e.g. using a (e.g. in-built) digital camera), and gaming functions.

BACKGROUND

Latching mechanisms are used to allow a user to releasably attach/engage a cover onto a PDA, for example latching elements are used on removable battery covers to allow a user to conveniently replace one or more batteries (or SIM cards) of a PDA. Latching mechanisms are also used for removable fascias to releasably attach different fascias to a PDA.

The listing or discussion of a prior-published document or any background in this specification should not necessarily be taken as an acknowledgement that the document or background is part of the state of the art or is common general knowledge. One or more aspects/embodiments of the present invention may or may not address one or more of the background issues.

SUMMARY

In a first aspect, there is provided a latching mechanism for a portable electronic device, the latching mechanism comprising one or more of a male/female element for providing latching under physical engagement with one or more of a complementary female/male element, one or more of the male/female elements configured to be moved from an unlatched configuration to a latched configuration by inter-engagement, the latched configuration providing physical inter-engagement of the male and female elements which provides a bias to the one or more of the male/female elements that resists physical disengagement of the male and female elements.

The latching mechanism may be configured to be movable from the unlatched configuration to the latched configuration by laterally slidable inter-engagement, rotatably slidable inter-engagement, or top-down inter-engagement of the respective male/female elements.

The bias may be provided in a direction substantially orthogonal to the direction of inter-engagement.

The female element may be configured to provide for a decrease in spacing between the male and female element in a direction orthogonal to the direction of inter-engagement, such that upon movement from the unlatched configuration to the latched configuration, the male and female elements physically inter-engage to provide the bias. The female element may be substantially triangular, trapezium-like, circular, elliptical, quadrilateral, bottle-necked, or semi-bottle-necked in shape (or a combination thereof).

One or more of the male/female elements may be configured to comprise one or more elastically compressible materials to provide the bias. One or more of the male/female elements may comprise one or more elastically compressible materials (e.g. entirely) through the thickness of the element(s), on an outer engaging face of the element, or on an inner part of the element.

One or more of the male/female elements may be a deformable element configured to deform by inter-engaging to provide the bias in the latched configuration.

The insertion area of the female element may at least partially be defined by an adjacent flexible member, and the flexible member may be configured to flex upon inter-engagement of the male/female elements to provide a returning bias force to resist disengagement. The flexible member may be configured to be defined between an adjacent flexing aperture and the insertion area. The flexible member may comprise a ridge that negatively engages the male element upon inter-engagement.

The flexing aperture may be configured to be substantially the same length as the insertion area in the direction of insertion.

The flexing aperture may be configured to be located to extend along the physical inter-engagement length of the female element.

The male element may be a substantially pillar-like element with a substantially circular or elliptical cross sectional area. The male element may comprise a compression aperture that extends the across the male element. The male element may comprise a compressible element within the compression aperture.

The latching mechanism may further comprise a second male/female element for providing latching under physical engagement with a second complementary female/male element according to the first aspect, and the two male/female elements may be configured to be substantially parallel to one other to provide biasing in opposing directions.

The latched configuration may provide latching in at least one direction, and the latching mechanism may further comprise snaps and/or hooks configured to provide latching in at least one other direction.

In a second aspect, there is provided a means for providing a latching mechanism for a portable electronic device, the means for providing a latching mechanism comprising one or more of a male/female means for providing latching under physical engagement with one or more of a complementary female/male means for providing latching, one or more of the male/female means for providing latching configured to be moved from an unlatched configuration to a latched configuration by inter-engagement, the latched configuration providing physical inter-engagement of the male and female means for providing latching which provides a bias to the one or more of the male/female means for providing latching that resists physical disengagement of the male and female means for providing latching.

In a third aspect, there is provided a latching insert for a portable electronic device, wherein the insert comprises the latching mechanism according to the first aspect and is configured to be insertable into a portable electronic device to provide a latching mechanism for the portable electronic device.

Also described herein is a latching mechanism for a portable electronic device, wherein the one or more male/female element according to the first aspect is comprised in a cover for a portable electronic device, and wherein the male/female element is configured to provide for latching under physical interengagement with a complementary female/male element comprised in an apparatus for a portable electronic device.

In a fifth aspect, there is provided a housing for a portable electronic device, comprising the latching mechanism according to the first aspect, configured to provide latching under physical engagement with a complementary female/male element comprised in a cover for a portable electronic device.

The present invention includes one or more corresponding aspects, embodiments or features in isolation or in various combinations whether or not specifically stated (including claimed) in that combination or in isolation. Corresponding means for performing one or more of the discussed functions are also within the present disclosure.

The above summary is intended to be merely exemplary and non-limiting.

BRIEF DESCRIPTION OF THE FIGURES

A description is now given, by way of example only, with reference to the accompanying drawings, in which:

FIG. 4 shows the inter-engagement of the male and female elements in a latched configuration.

FIG. 6a shows another embodiment of the present invention (triangular female element).

FIG. 6b shows another embodiment of the present invention (triangular female element with two flexing apertures, two flexible members and a single insertion aperture).

FIG. 7a-7e shows variations of the male element.

FIG. 8 shows lateral slidable inter-engagement of the latching cover with the housing.

DESCRIPTION OF SPECIFIC EMBODIMENTS

Figure 1:
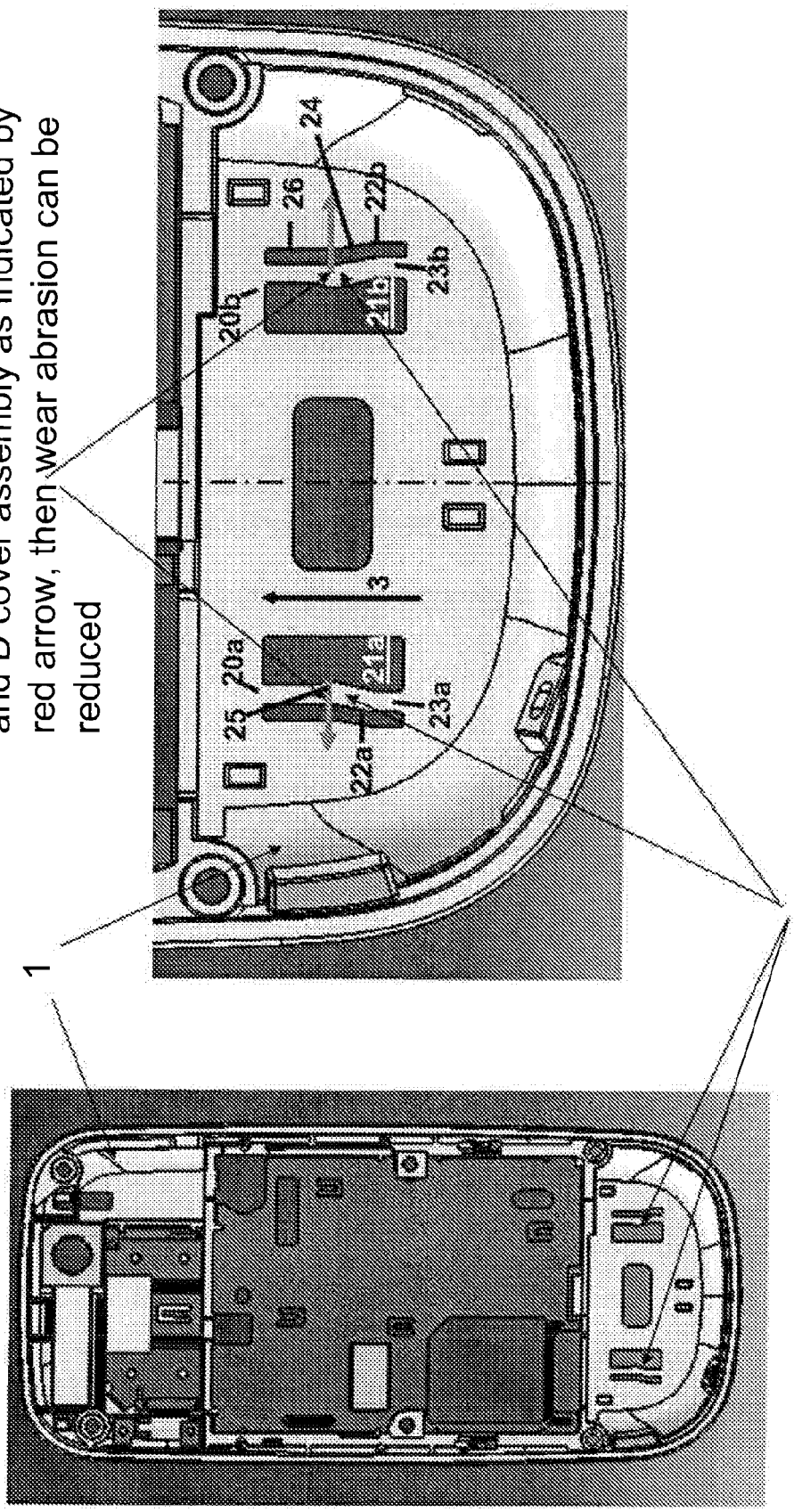
FIG. 1 shows a housing for a portable electronic device comprising a female element according to a first embodiment of the latching mechanism.
Figure 2:
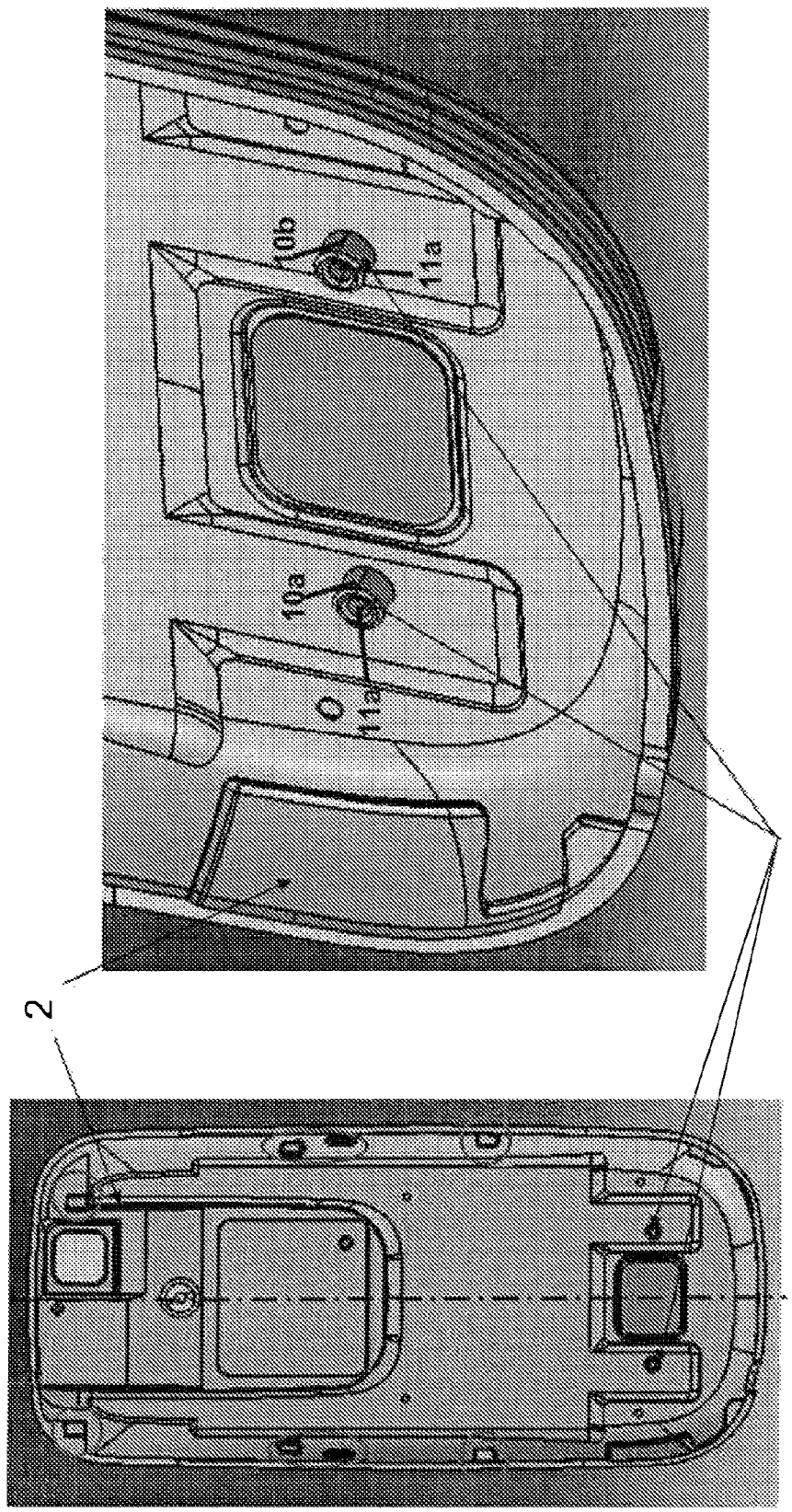
FIG. 2 shows a latching cover for the housing of FIG. 1 comprising a complementary male element according to the first embodiment of the latching mechanism.

FIG. 1 shows a housing 1 for a portable electronic apparatus (in this case a mobile phone or PDA) and FIG. 2 shows a latching cover 2 (in this case a battery cover) for said housing 1, wherein said latching cover 2 is arranged to be a complementary fit with the housing 1.

The housing 1 comprises two female elements 20a, 20b. The female elements 20a, 20b are provided on an outer surface of the housing 1 and are formed in/from the housing 1; however they can also be formed separately on latching mechanism inserts suitable for insertion into such housings. The female elements 20a, 20b are arranged in the housing 1 such that they are a mirror image/reflection of each other in the dotted axis of the housing in FIG. 1. As they are identical in function, the operation of the individual female elements 20a, 20b will be described by reference to one female element 20.

The female element 20 is semi-bottle-neck shaped (see FIG. 1), the narrower end of the semi-bottle-neck shape being in direction of inter-engagement 3. The female element 20 comprises a flexible member 23, an insertion aperture 21 and a flexing aperture 22.

The flexible member 23 extends lengthwise across the female element 20 in the direction of inter-engagement 3. The apertures 21, 22 are thereby defined by and separated by the provision of the flexible member 23 across the female element 20. The side/edge of the flexible member 23 opposing the contoured portion 24 of the female element 20 is shaped complementary to said contoured portion 24. The side/edge of the flexible member 23 opposing the straight portion 26 of the female element 20 is shaped like the contoured portion 24. The flexible member 23 is arranged to flex into flexing aperture 22 upon physical inter-engagement between the flexible member 23 and a complementary male element 10.

The flexible member 23 also comprises a ridge 25 provided half-way along the length of the flexible member 23. This ridge provides for negative inter-engagement with an inserted complementary male element 10.

The insertion aperture 21 provides, in this embodiment, an aperture for insertion of a complementary male element 10. The flexing aperture 22 provides an aperture for the flexible member to flex into when under physical inter-engagement with a complementary male element 10, at least in this embodiment. It will be appreciated that these apertures 21, 22 can be used, in some embodiments, for a variety of other functions such as drainage cavities, wiring conduits etc.

FIG. 2 shows a latching cover 2 for the housing 1, wherein said latching cover 2 is arranged to be a complementary fit with the housing 1. The latching cover 2 comprises two male elements 10a, 10b. The male elements 10a, 10b are formed in/from the latching cover 2 and provided on an inner surface of the latching cover 2; however they can also be formed separately on latching mechanism inserts suitable for insertion into such latching covers. Male elements 10a, 10b are provided in the latching cover 2 such that they are a mirror image/reflection of each other in the dotted axis of the latching cover 2 in FIG. 2. The male elements 10a, 10b are pillar-like structures, and each comprise a central hollow 11 provided along the axis of symmetry of respective male elements 10a, 10b.

Figure 3:
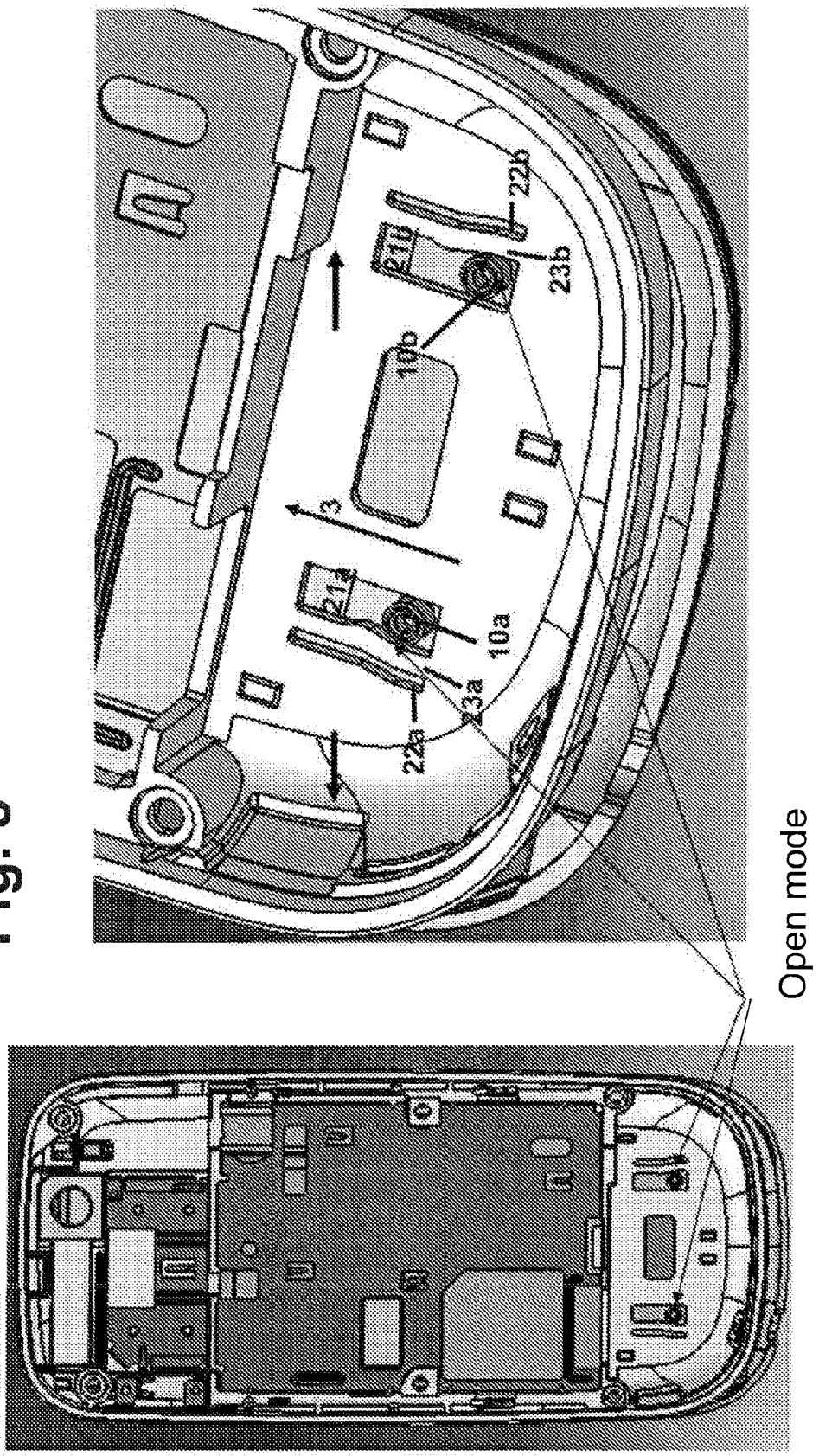
FIG. 3 shows the inter-engagement of the male and female elements in an unlatched configuration.

Referring to FIG. 3, the latching cover 2 is fitted with/to the housing 1, the latching cover 2 being offset from a complementary fit with the housing 1. The male elements 10a, 10b are inserted into the insertion apertures 21a, 21b (respectively) of their corresponding female elements 20a, 20b by the fitting of the housing 1 and the latching cover 2 together.

In this unlatched configuration, the male element 10 is not in contact with the flexible member 23. The flexible member 23 is (therefore) not flexed (or deformed in the variation where the flexible member 23 is deformable) by forced contact with the male element 10, and no bias (a returning/reaction force due to flexing of said flexible member 23) is experienced by the male element 10 of the latching cover 2.

The latching cover 2 is (therefore) easily removable from the housing 1 as it is free from any biasing or restrictive forces provided/caused by latching mechanism 10, 20 (combination of the male and female elements 10, 20).

Referring to FIG. 4, the latching cover 2 is slidably inter-engaged with the housing 1 in the direction of inter-engagement 3 to provide a latched configuration, the latching cover 2 being slidably moved parallel to the housing 1.

The male element 10, located in the corresponding insertion aperture 21, is thereby slid in the direction of inter-engagement. The male element 10 comes into contact with the flexible member below the ridge 25 (relative to the direction of inter-engagement 3) and is slidably moved up the length of the flexible member 23 in the direction of inter-engagement.

With the male element 10 in contact with the flexible member 23, the flexible member 23 is forcibly flexed in a direction orthogonal to the direction of inter-engagement by the male element 10, into the flexing aperture 22. The ridge 25 provides an increase in width of the flexible member in the direction of the insertion aperture 21. This results in an increased flexing of the flexible member 23 as the male element 10 slides further up the length of the member in the direction of inter-engagement.

The flexing of the flexible member 23 due to the forced contact/inter-engagement of the male element 10 provides a bias in the form of a returning/reaction force that is experienced by the male element 10 in a direction orthogonal to the direction of inter-engagement 3.

Once the male element 10 has been slid beyond the peak of the ridge 25, it positively inter-engages with the inward curve provided by the upper edge of the ridge 25. The housing 1 and the latching cover 2 are now in the latched configuration. Due to the semi-bottle-neck contour of the inside edge of the flexible member 23, the male element 10 will remain in forced contact/physical inter-engagement with the flexible member 23. The flexible member 23 will therefore remain flexed and continue to provide said bias to the male element 10 in the direction orthogonal to the direction of inter-engagement 3.

The provision of the two opposing pairs of latching mechanisms (10a, 20a; 10b, 20b) lock the latching cover 2 with/to the housing 1 by means of the two provided biases acting in opposite directions, thereby providing for secure latching of the latching cover 2 in this direction/axis.

Figure 12:
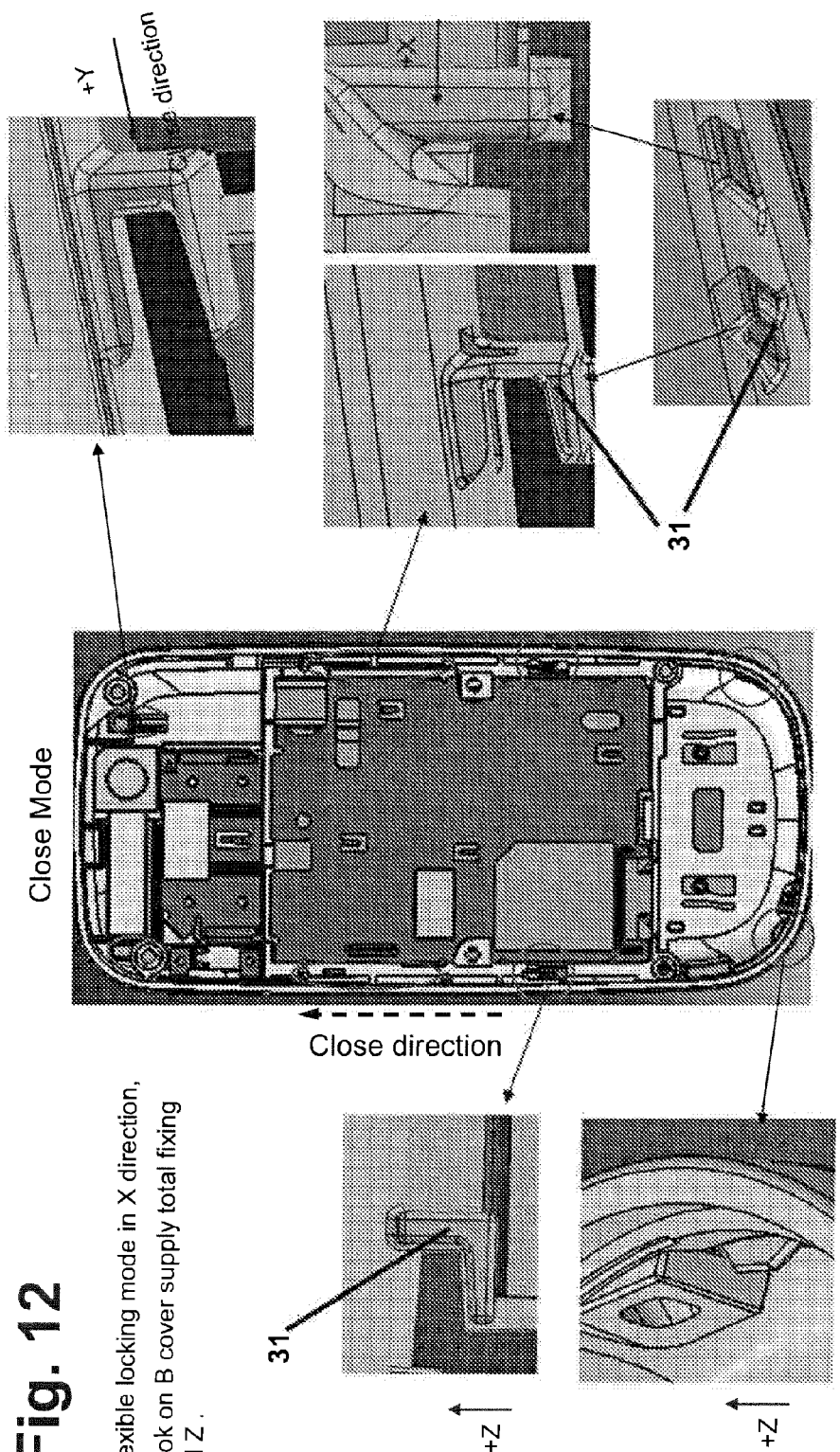
FIGS. 12-14 show the snap/hook and snap/hook receptacles used to secure/fix the latching mechanism in at least one more direction.
Figure 13:
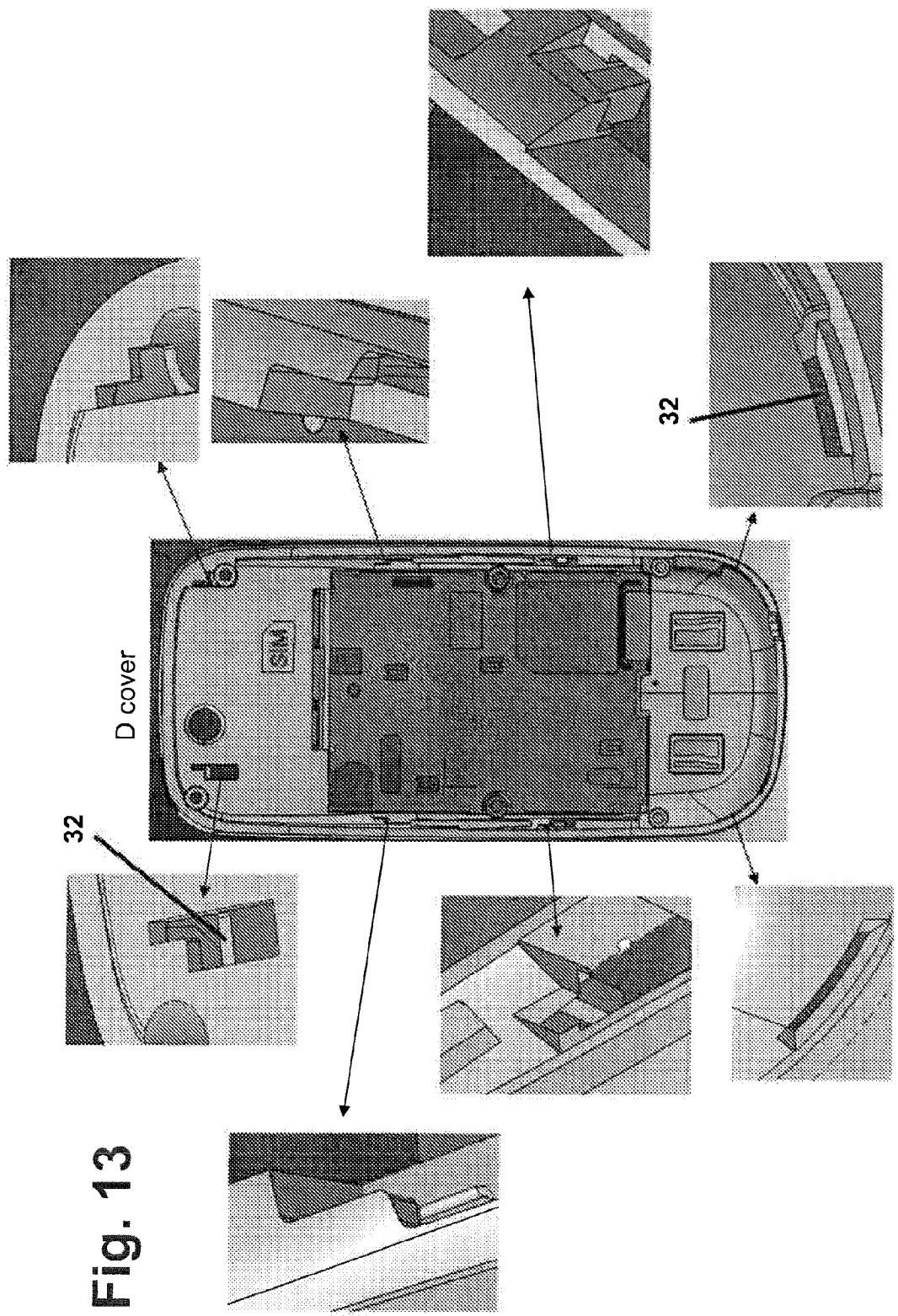
Figure 14:
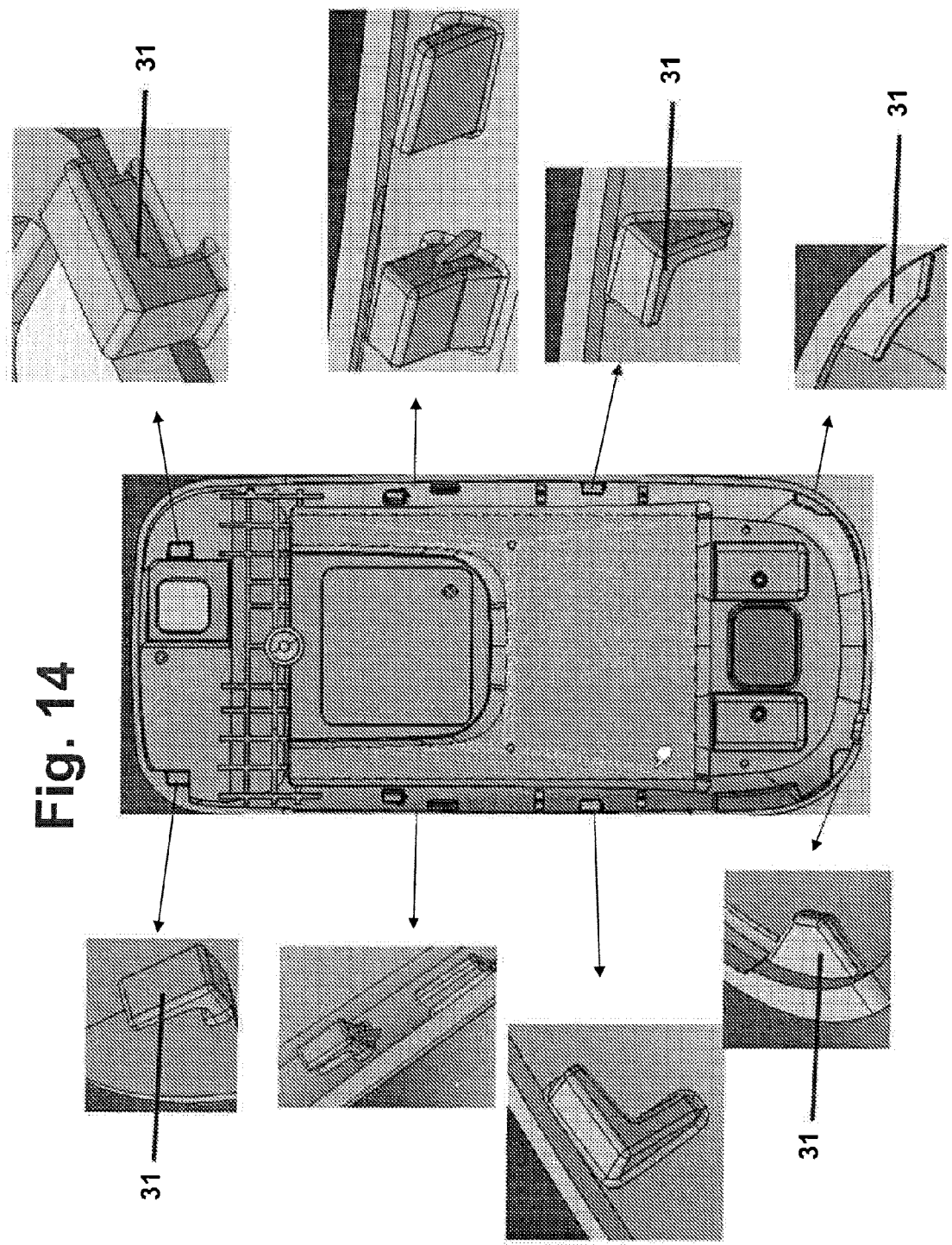

The latching cover 2 also comprises snaps/hooks 31 (see FIG. 12-14) arranged to fit into complementary shaped snap/hook receptacles 32 comprised by the housing 1. This provides for locking of the latching cover 2 in directions that the latching cover 2 has not been locked in by the latching mechanism (10a, 20a; 10b, 20b), which in this embodiment is in the direction of inter-engagement 3 and also into the plane of the housing 1 and latching cover 2.

The latching cover 2 can be returned to the unlatched configuration by slidable movement of the latching cover 2 in the opposite direction to the direction of inter-engagement 3. The above described process is therefore reversed and the latching cover 2 enters into an unbiased state in the unlatched configuration whereupon it can be removed from contact with the housing 1.

It will be appreciated that the latching/locking action provided by the flexing of the flexible member 23 in this embodiment can be provided by flexing, deformation, compression or a number of other alternative means. For example, the flexing action afforded by the flexible member 23 and the flexing aperture 22 can be provided instead by an elastically compressible material in place of or in addition to the flexible member 23 and flexing aperture (not shown). A further alternative is for the flexible member 23 to not be flexible, but to instead be separate from the female element and movable on a spring element provided in the flexing aperture (not shown), thus providing for a compression fit by means of a compression spring.

Figure 5B:
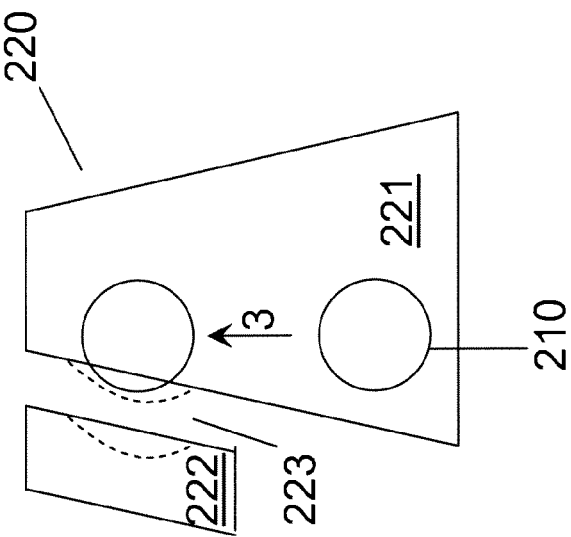
FIG. 5b shows another embodiment of the present invention (trapezium-shape female element with half-length flexing aperture).
Figure 5A:
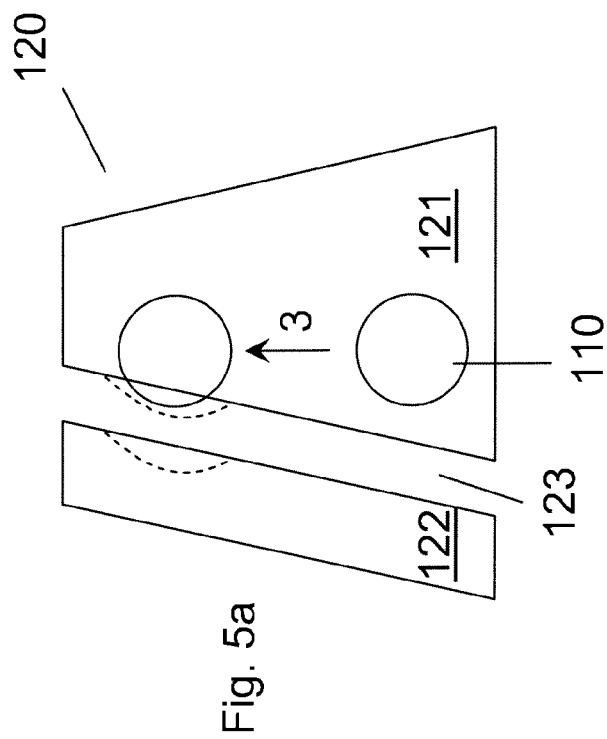
FIG. 5a shows another embodiment of the present invention (trapezium-shape female element).

Referring to FIG. 5a, there is provided another embodiment that is substantially the same as the first embodiment described above, but wherein the female element is shaped like a trapezium. The outer side of the flexible member 123 opposing the outer edge of the flexing aperture 122 is formed/configured to be a complementary shape/contour with the outer edge contour of the flexing aperture 122. The inner side of the flexible member 123 opposing the outer edge of the insertion aperture 121 is formed/configured to be the same shape/contour with the outer edge contour of the flexing aperture 122.

The latching mechanism 110, 120 functions in the same manner as the first described embodiment. It provides the inter-engagement bias against the male element 110 as a result of the physical inter-engagement and forced contact of the male element with the flexible member 123.

Referring to FIG. 5b, there is provided another embodiment substantially the same as the second described embodiment depicted in FIG. 5a. In this embodiment the flexing aperture extends for only half the length of the nearest side of the insertion aperture (see FIG. 5b) to provide an alternative means of positive inter-engagement provided by ridge 25 in the first described embodiment.

As the male element 210 is slid in the direction of inter-engagement 3, the male element comes into contact with the flexible member 223 at the point in line with the beginning of the flexing aperture 222. There will be little/no flexing of the flexible member 223 below this initial contact point due to the lack of a flexing aperture 222 for the flexible member 223 to flex into.

As the male element 210 is slid further up the flexible member 223 (in the region provided with the shorter flexing aperture 222) the flexible member 223 will flex into the flexing aperture 222 increasingly more so until the male element 210 is contacted with the flexible member at the midpoint of the flexing aperture 222. This point provides the most positive inter-engagement point with the male element 210.

In each of these embodiments, the flexing is achieved by the female element being configured to provide for a decrease in spacing between the male and female element in a direction orthogonal to the direction of inter-engagement. This means that upon movement from the unlatched configuration to the latched configuration, the male and female elements enter into forced contact and thereby physically inter-engage so as to provide the bias that prevents disengagement of the latching mechanism. It will therefore by appreciated that female elements of various shapes can be used to provide for this function, such as triangles, quadrilaterals, irregular shapes, circles, ellipses, bottle-neck shapes etc. It will also be appreciated that more than one flexible member and corresponding flexing aperture can be provided in any one embodiment (see FIG. 6b; described below).

FIGS. 6a & 6b show an example of a triangular female element. FIG. 6b shows a particularly advantageous embodiment wherein the male element 410 is contacted on both sides by flexible members 423a & 423b when inter-engaged with the corresponding female element 420.

It is the reaction force provided by the deformation/flexing of the flexible member of the female element experienced by the contacted male element that provides the latching action/mechanism. As reaction forces in static systems are in response to an equal and opposite applied force, the flexing/deformation arrangement that provides this can be arranged in the male and/or the female element as they are contacted with each other. In one variation, the male element 10 in the first described embodiment is formed from a deformable material (e.g. silicone rubber) that is configured to deform upon inter-engagement with the female element 20.

Referring to FIGS. 7*a*, *b*, *c*, *d* & *e*, there are shown other variations wherein the male elements are the elements that experience the compression/flexing/deformation necessary to provide the biasing reaction force that opposes disengagement of the male and female elements.

FIG. 7*a* shows a variation of the male element 510*a*, wherein the male element 510*a* is entirely comprised of an elastically compressible material such as rubber, soft plastic etc.

FIG. 7*b* shows a variation of the male element 510*b*, wherein the outer periphery of the male element 510*b* comprises an elastically compressible material (see above).

FIG. 7*c* shows a variation of the male element 510*c*, wherein only a portion of the male element 510*c* to be contacted with the female element 520*c* is comprised of an elastically compressible material.

FIG. 7*d* shows a variation of the male element 510*d*, wherein the male element 510*d* is provided with a compression aperture 513*d* that extends across the male element 510*d*. The compression aperture 513*d* defines and separates left and right portions of the male element 510*d*. In a similar fashion to the flexing of the flexing aperture 22 and flexible member 23 in the first described embodiment, the compression aperture 513*d* allows for flexing of the portion of the male element 510*d* to be contacted with the female element 520*d* when the male element is physically inter-engaged with the female element 520*d*.

FIG. 7*e* shows an variation of the male element 510*e* according to the variation in FIG. 7*d*, wherein the provided compression aperture comprises a compressible element that allows for compression of the male element in a direction orthogonal to the direction of insertion, e.g. elastically compressible material such as silicone rubber or a compressible element such as a compression spring. In each of these variations, the corresponding female element 520*a-e* can be provided without a flexing aperture 522*a-e* and flexible member 523*a-e* as the flexing/deformation/compression aspect is provided by the male element 510*a-e*.

FIG. 8 shows the inter-engagement of the first described embodiment, the latching cover 2 being physically inter-engaged by lateral sliding movement parallel to the housing 1. However this is not the only method of inter-engagement that can be used; each of these latching mechanisms can be implemented in a number of different ways.

Figure 9:
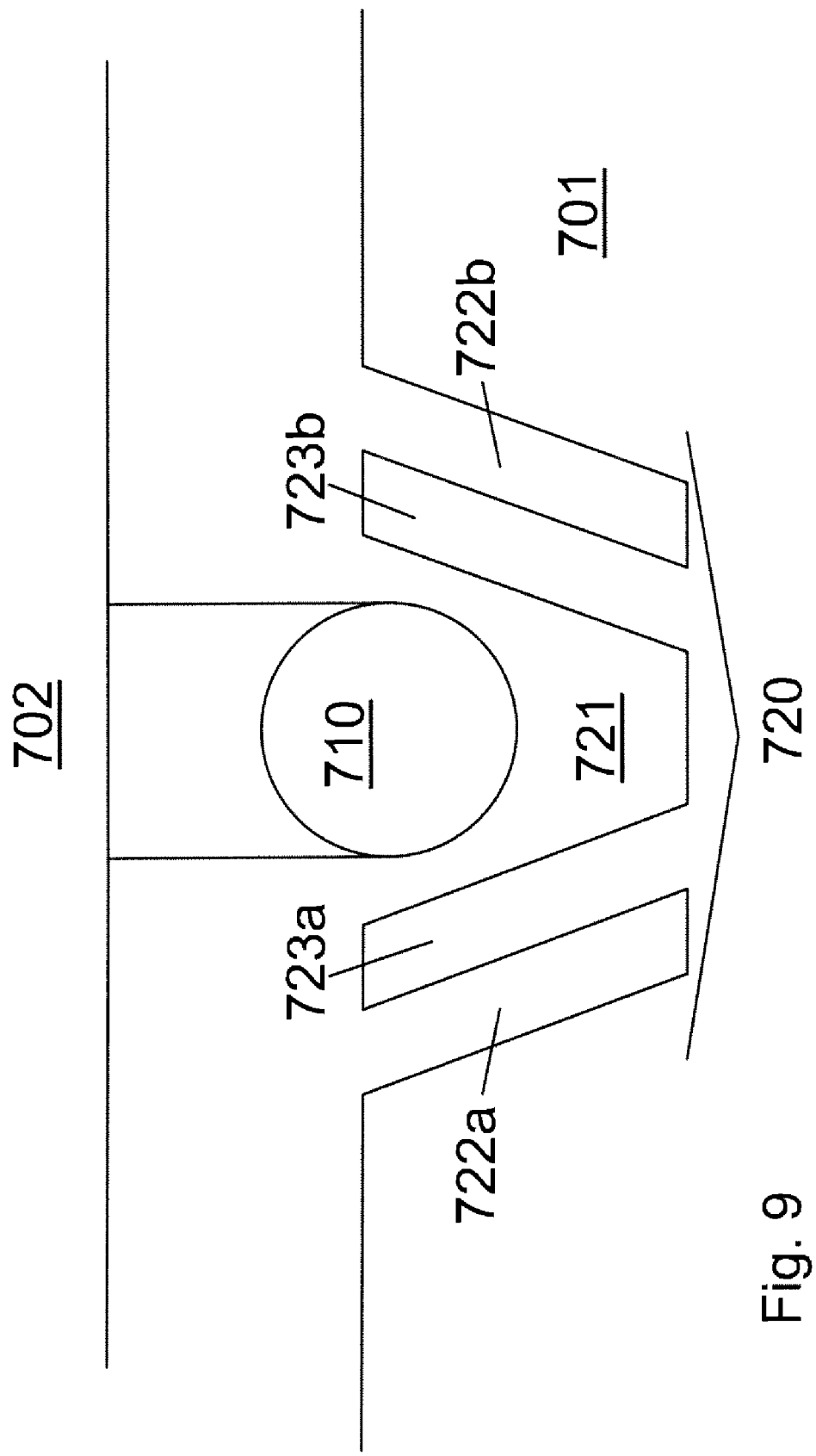
FIG. 9 shows top-down inter-engagement of the latching cover with the housing.

Referring to FIG. 9, there is a shown a top-down method of insertion of a variation of the first described embodiment. The female element 720 is oriented such that the direction of insertion of the male element 710 into the female element 720 is also the direction of inter-engagement 3. The female element 720 comprises first and second flexible members 723*a*, *b*, defining first and second flexing apertures 722*a,b* and a single insertion aperture 721. The apertures 721, 722*a,b* are each open at one end, said ends being located on the outer surface of the housing 1. In other embodiments, these ends may be closed (or at least linked).

The male element 710 is also oriented in a similar manner as the female element 720 such that the pillar-like structure is now a barrel-like structure, said structure being arranged to provide a complementary fit with the insertion aperture 721 of the female element 720.

This orientation of the latching mechanism 710, 720 allows the latching cover 702 to be inserted in a top-down/snap-fit fashion onto the housing 601 to provide for latching.

Figure 10:
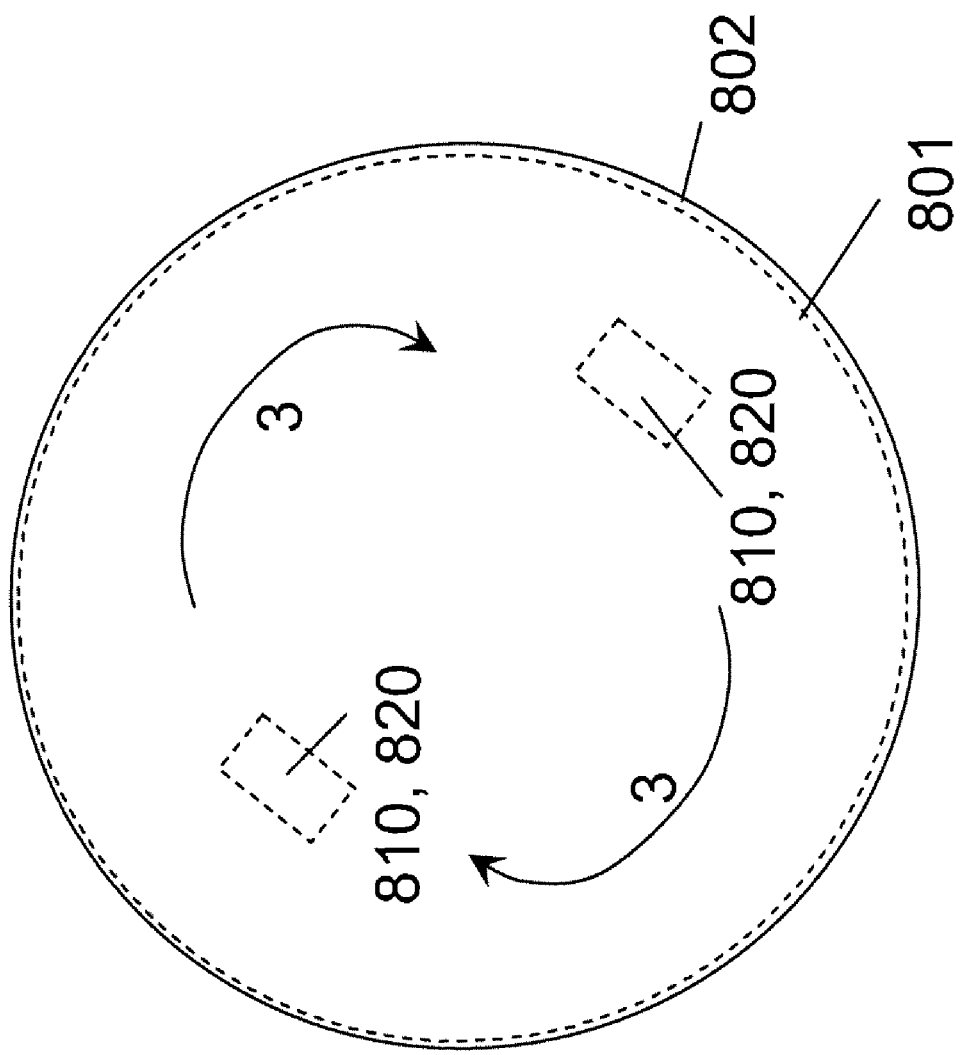
FIG. 10 shows rotatably slidable inter-engagement of the latching cover with the housing.

Referring to FIG. 10, there is shown a rotatably slidable method of inter-engagement of the first described embodiment. The first and second female elements are arranged to be placed in the two shown locations in an orientation that makes them rotatably symmetric, i.e. allowing for rotational movement of the latching cover 802 to provide for rotational inter-engagement of the latching mechanism 810, 820.

Figure 11:
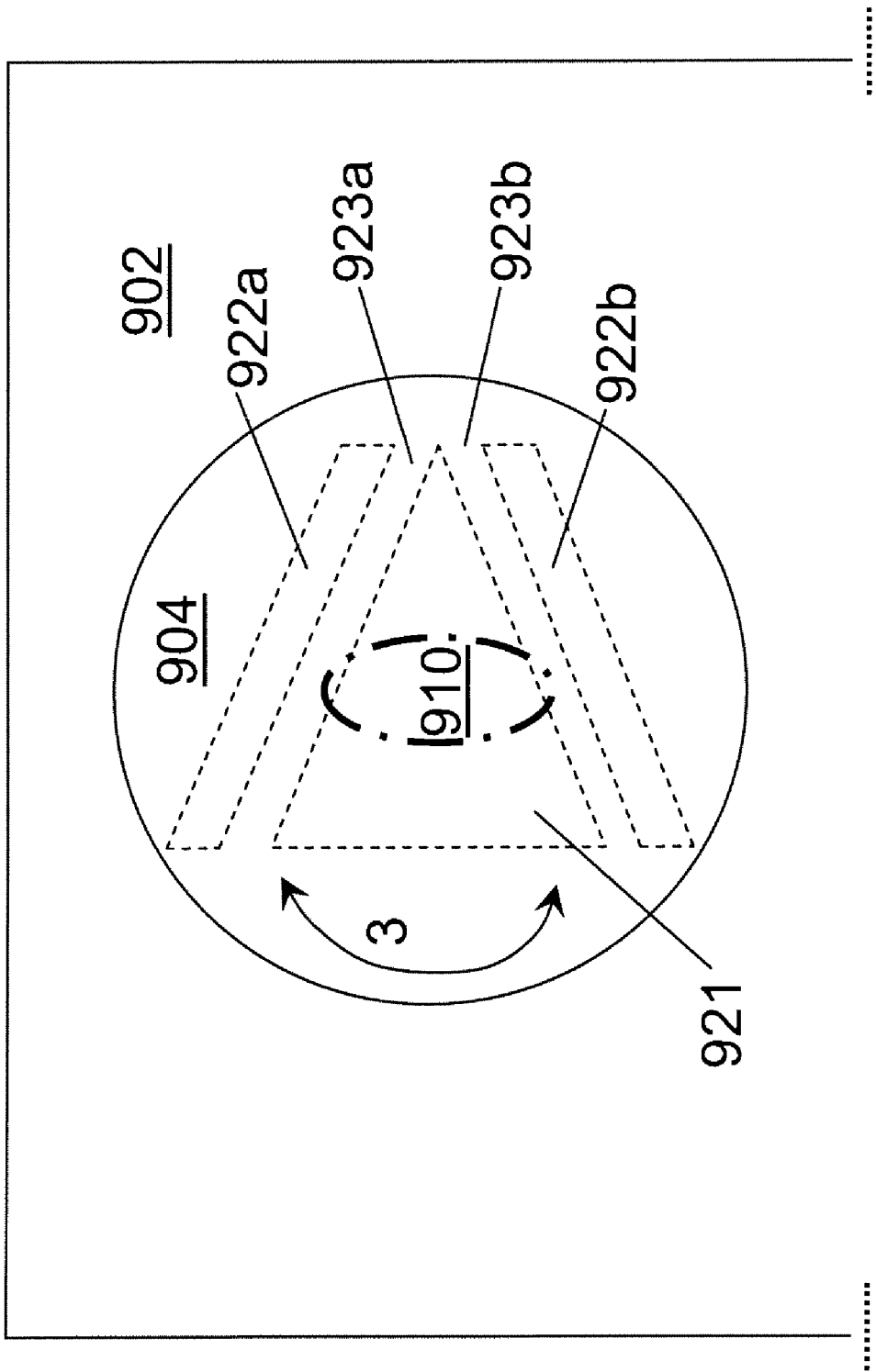
FIG. 11 shows rotatably slidable inter-engagement of the latching cover with the housing (second variation).

Referring to FIG. 11, there is shown a second rotatably slidable method of inter-engagement of a further embodiment. The female element 920 is arranged to be the same as the female element of FIG. 6*b*. The latching cover 902 comprises a rotatable disc 904 and a male element 910 arranged on the inner surface of the rotatable disc 904, wherein the male element 910 is a pillar-like structure (as in the first described embodiment) but with an elliptical cross section. The rotatable disc 904 is arranged to be rotatable by a user from the outer surface of the latching cover 902 (i.e. the outer surface not being in contact with the housing 901) and thereby provide for rotation of the male element 910 within the insertion aperture 921.

The latching cover 902 is applied to the housing 901 with the rotatable disc 904 in a first position wherein the extremities of the elliptical cross section of the male element 910 are not in contact with the flexible members 910*a*, *b* (i.e. corresponds to the unlatched configuration). The rotatable disc 904 (and thereby the male element 910) is rotatable to a second position that is offset by 900 from the first position, wherein the extremities of the elliptical cross section of the male element 910 physically inter-engage/make contact with the flexible members (i.e. corresponds to the latched configuration). The male element 910 then experiences biasing forces in the same manner as the embodiment in FIG. 6*b*, i.e. due to inter-engagement with both flexible members 923 on opposite sides of the female element 920. The rotatable disc 904 is rotatable back to the first position to allow for removal of the male element 910 from the female element 920 and thereby the latching cover 902 from the housing 901.

Figure 15:
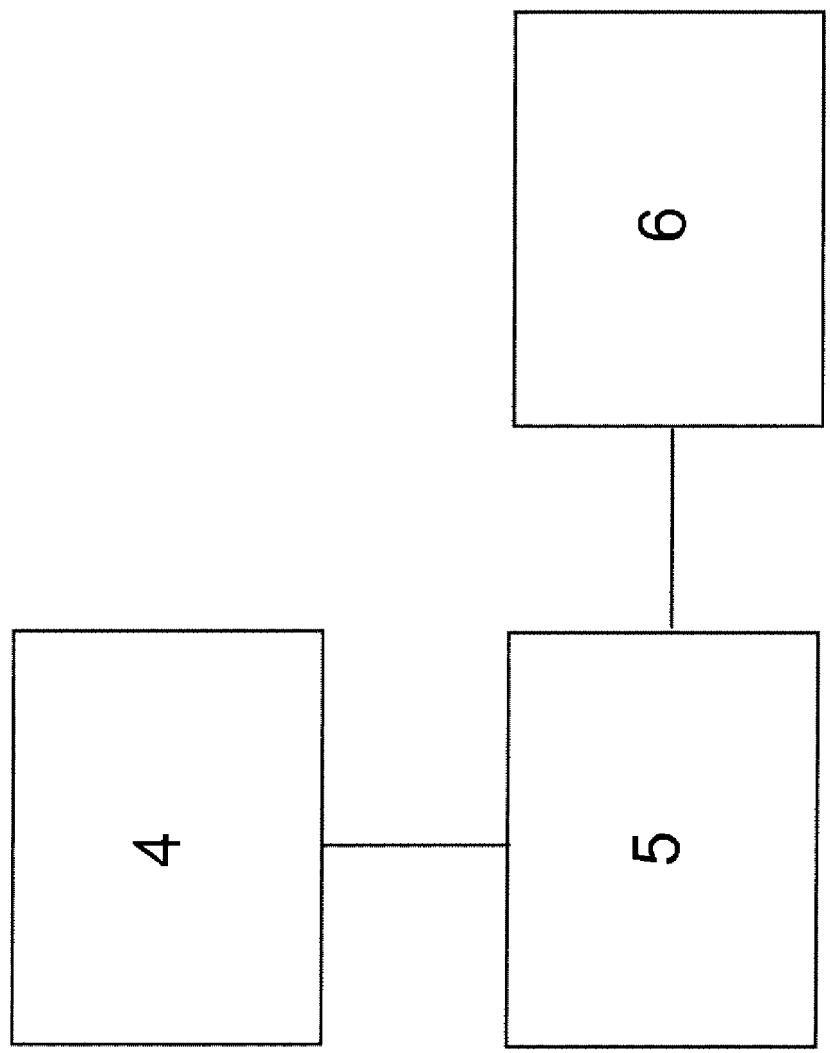
FIG. 15 shows a flowchart of the physical inter-engagement of the male/female element with a complementary female/male element.

FIG. 15 shows a flowchart of the above described method by which the latching mechanism is latched. The male/female element is inserted into a complementary female/male element (step 4), this thereby provides a bias (step 5). This bias thereby resists disengagement of the male and female elements (step 6).

It will be appreciated that the aforementioned features/apparatus/elements may have other functions in addition to the mentioned functions, and that these functions may be performed by the same features/apparatus/element.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. A latching mechanism for a portable electronic device, the latching mechanism comprising one or more of a male/female element configured to provide for latching under physical engagement with one or more of a complementary female/male element, one or more of the male/female elements configured to be moved from an unlatched configuration to a latched configuration by inter-engagement, the latched configuration configured to provide for physical inter-engagement of the male and female elements which is configured to provide a bias to the one or more of the male/female elements that resists physical disengagement of the male and female elements wherein the female element is further configured to provide for a decrease in spacing between the male and female elements in a direction orthogonal to the direction of inter-engagement, and wherein the bias is provided in a direction substantially orthogonal to the direction of inter-engagement, the directions of the bias, the decrease in spacing, and the inter-engagement being substantially co-planar.

2. The latching mechanism according to claim 1, wherein the latching mechanism is configured to be movable from the unlatched configuration to the latched configuration by laterally slidable inter-engagement, rotatably slidable inter-engagement, top-down inter-engagement, or a combination thereof of the respective male/female elements.

3. The latching mechanism according to claim 1, wherein upon movement from the unlatched configuration to the latched configuration, the male and female elements physically inter-engage to provide the bias.

4. The latching mechanism according to claim 3, wherein the female element is substantially triangular, trapezium-like, circular, elliptical, quadrilateral, bottle-necked, or semi-bottle-necked in shape.

5. The latching mechanism according to claim 1, wherein one or more of the male/female elements comprise one or more elastically compressible materials configured to provide the bias.

6. The latching mechanism according to claim 5, wherein one or more of the male/female elements comprises one or more elastically compressible materials through the thickness of the element(s), on an outer engaging face of the element, or on an inner part of the element.

7. The latching mechanism according to claim 5, wherein one or more of the male/female elements comprises at least one elastically compressible material through the thickness of the element(s), on an inner part of the element.

8. The latching mechanism according to claim 1, wherein one or more of the male/female element is a deformable element configured to deform by inter-engaging to provide the bias in the latched configuration.

9. The latching mechanism according to claim 1, wherein the insertion area of the female element is at least partially defined by an adjacent flexible member, and wherein the flexible member is configured to flex upon inter-engagement of the male/female elements to provide a returning bias force to resist disengagement.

10. The latching mechanism according to claim 9, wherein the flexible member is configured to be defined between an adjacent flexing aperture and the insertion area.

11. The latching mechanism according to claim 9, wherein the flexible member comprises a ridge that negatively engages the male element upon inter-engagement.

12. The latching mechanism according to claim 1, wherein the male element is a substantially pillar-like element with a substantially circular or elliptical cross sectional area.

13. The latching mechanism according to claim 1, wherein the male element comprises a compression aperture that extends the across the male element.

14. The latching mechanism according to claim 13, wherein the male element comprises a compressible element within the compression aperture.

15. The latching mechanism according to claim 1, wherein the latching mechanism further comprises a second male/female element for providing latching under physical engagement with a second complementary female/male element as claimed in claim 1, and wherein the two male/female elements are configured to be substantially parallel to one another to provide biasing in opposing directions.

16. The latching mechanism according to claim 1, wherein the latched configuration provides latching in at least one direction, and wherein the latching mechanism further comprises a snap or hook configured to provide latching in at least one other direction.

17. The latching mechanism according to claim 1, wherein the latching mechanism is configured to be insertable into a portable electronic device to provide a latching mechanism for the portable electronic device.

18. The latching mechanism according to claim 1, wherein the one or more male/female element is comprised in a cover for a portable electronic device, and wherein the male/female element is configured to provide for latching under physical engagement with a complementary female/male element comprised in an apparatus for a portable electronic device.

19. An apparatus for portable electronic device, comprising the latching mechanism of claim 1 configured to provide latching under physical engagement with a complementary female/male element comprised in a cover for a portable electronic device.

20. A means for providing a latching mechanism for a portable electronic device, the means for providing a latching mechanism comprising one or more of a male/female means configured to provide for latching under physical engagement with one or more of a complementary female/male means for providing latching, one or more of the male/female means for providing latching configured to be moved from an unlatched configuration to a latched configuration by inter-engagement, the latched configuration configured to provide physical inter-engagement of the male and female means for providing latching which is configured to provide a bias to the one or more of the male/female means for providing latching that resists physical disengagement of the male and female means for providing latching, wherein the female means is further configured to provide for a decrease in spacing between the male and female means in a direction orthogonal to the direction of inter-engagement, and wherein the bias is provided in a direction substantially orthogonal to the direction of inter-engagement, the directions of the bias, the decrease in spacing, and the inter-engagement being substantially co-planar.

21. A method of latching for a portable electronic device, wherein a latching mechanism comprises one or more of a male/female element for providing latching under physical engagement with one or more of a complementary female/male element, the method comprising the steps of: moving the one or more male/female elements from an unlatched configuration to a latched configuration by inter-engagement, wherein the latched configuration is configured to provide for physical inter-engagement of the male and female elements which is configured to provide a bias to the one or more male/female elements that resists physical disengagement of the male and female elements, the female element providing for a decrease in spacing between the male and female elements in a direction orthogonal to the direction of inter-engagement, and wherein the bias is provided in a direction substantially orthogonal to the direction of inter-engagement, the directions of the bias, the decrease in spacing, and the inter-engagement being substantially co-planar.

* * * * *